United States Patent [19]

Gillon, Jr. et al.

[11] Patent Number: 4,739,613
[45] Date of Patent: Apr. 26, 1988

[54] BI-PROPELLANT BLADE VALVE ASSEMBLY

[75] Inventors: Willard A. Gillon, Jr., Canoga Park; Joseph L. Materas, Agoura, both of Calif.

[73] Assignee: Rockwell International Corporation, El Segundo, Calif.

[21] Appl. No.: 931,307

[22] Filed: Nov. 17, 1986

[51] Int. Cl.[4] .............................................. F02K 9/52
[52] U.S. Cl. ...................................... 60/211; 60/247; 60/258; 137/625.26; 137/625.37
[58] Field of Search ................. 60/211, 247, 254, 258, 60/259, 263; 137/625, 625.26, 625.37

[56] References Cited

U.S. PATENT DOCUMENTS

| | | | |
|---|---|---|---|
| 3,088,406 | 5/1963 | Horner | 102/49 |
| 4,326,377 | 4/1982 | Jaqua | 60/247 |

Primary Examiner—Donald P. Walsh
Attorney, Agent, or Firm—H. Fredrick Hamann; Harry B. Field; David C. Faulkner

[57] ABSTRACT

A compact, valve assembly (10) is provided having multiple chambers. A forward chamber (14) retains dual T-shaped blades (36) having shaped orifices (38) for controllably metering at least two fluids passing through the valve assembly. The valve assembly is also provided with a servo-valve assembly (70) and a piston indicator (62) assembly in cooperative association with the valve assembly.

22 Claims, 2 Drawing Sheets

BI-PROPELLANT BLADE VALVE ASSEMBLY

BACKGROUND OF THE INVENTION

1. Field of the Invention

This invention relates to a valve assembly for controlling fluid flow. More particularly, the present invention is directed to a fluid injection system for injecting propellants such as fuel into a combustion chamber of a fluid fueled rocket engine. For example, the valve assembly may be incorporated into a vehicle such as a re-entry interceptor system having four divert rocket engines in a cruciform arrangement.

2. Background Art

Various propulsion systems, discussed below and incorporated herein by reference, have means for injecting propellant(s) into the combustion chamber of a rocket engine.

Jaqua (U.S. Pat. No, 4,326,377) describes a system for injecting propellant utilizing a piston including orifices which direct propellant from the injection chamber into the combustion chamber. This is accomplished, in part, by the cooperation of a pair of valve members having concentric sleeves slidably mounted respectively on the inside and outside surfaces of the tubular portion of a piston.

Horner (U.S. Pat. No. 3,088,406) utilizes an injector pump and a solenoid assembly which function together to inject a predetermined amount of fuel into a rocket combustion chamber. The injector pump housing encloses three stepped pistons on a single shaft which can be activated by a driving gas derived from the thrust chamber through a conduit communicating therebetween. The driver piston is the motivating force displacing a fuel injector piston and an oxidizer injector. This arrangement allows the entire amount of predetermined quantities of fuel and oxidizers stored in the injector pump cylinder to be injected into a combustion chamber.

BRIEF SUMMARY AND OBJECTS OF THE INVENTION

The valve assembly of the present invention is both compact and designed to insure reliable and optimal performance when a controlled flow of two fluids is desired.

A valve assembly housing chamber having fluid inlet and outlet ports includes slidable blades positioned in functional relationship proximate these ports. Each blade has formed therein a shaped orifice or channel. A yoke, in cooperation with a piston and servo-assembly links the blades to a closed loop feedback control system.

When activated, the valve assembly is capable of controlled displacement or axial movement of the blades within the housing chamber. In turn, each blade orifice may be selectively positioned proximate a fluid inlet and outlet port to allow a flow of fluid(s) supplied from a remote source to pass through the valve assembly.

Accordingly, it is an object of this invention to provide a valve assembly for controllably mixing or dispensing diverse fluid.

Another object of this invention is to provide a fluid injection system for injecting propellants into a combustion chamber of fluid-fueled rocket engine.

These and other objects and features of the present invention will be apparent from the following detailed description, taken with reference to the accompanying drawings.

DETAILED DESCRIPTION OF THE INVENTION

Figure 1:
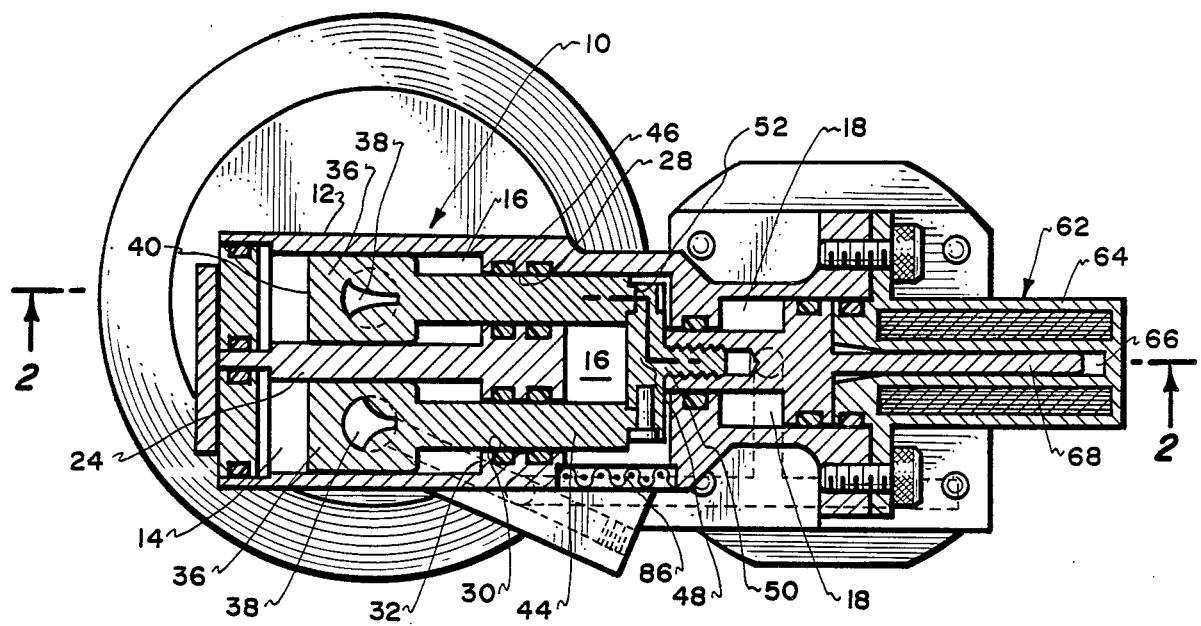
FIG. 1 is an elevational view, partially broken away, of the valve assembly of the present invention.

Turning now to the drawings and in particular to FIG. 1 thereof, there is shown a valve assembly (10) for controlling the flow of two fluids from a remote source for the intimate mixing or interaction thereof. This mixing and/or interaction may find application, for example, in a fluid sprinkling, spraying or diffusing apparatus but the preferred embodiment as described in greater detail below is a valve assembly in a fluid injection system for controllably injecting propellants into a reaction engine combustion chamber.

Referring to the drawings in detail, 10 indicates the valve assembly according to the present invention. Valve assembly includes a housing structure 12 defining forward 14, central 16 and aft chamber 18.

Figure 2:
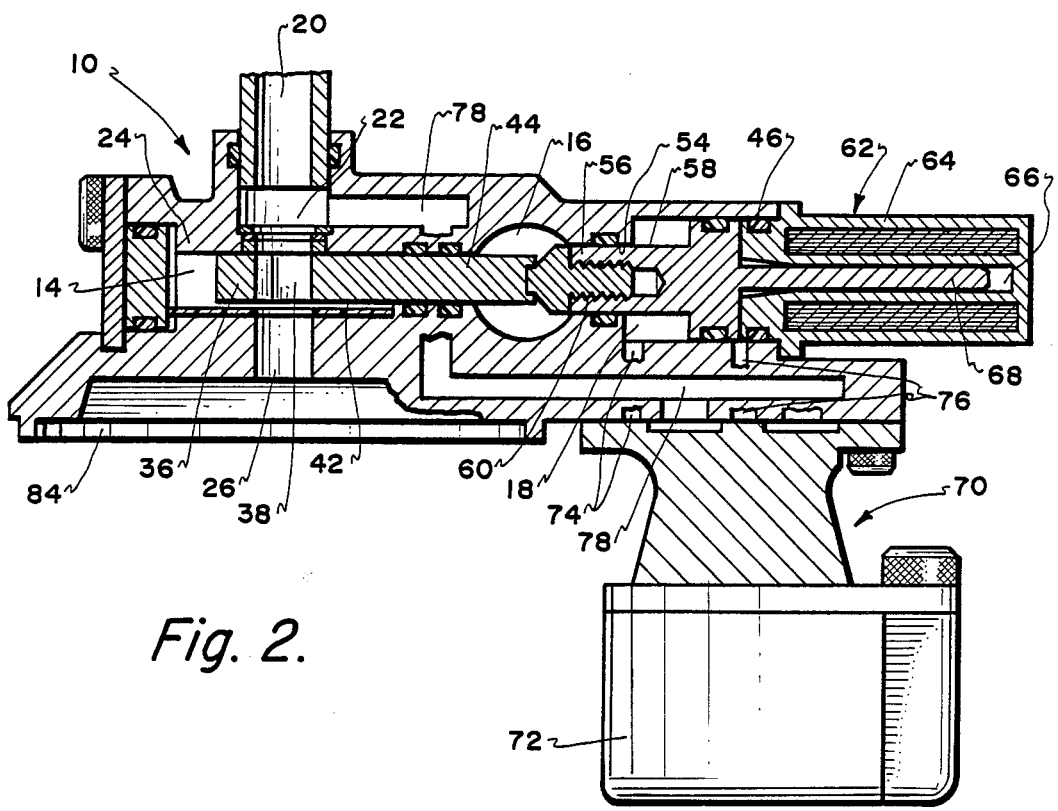
FIG. 2 is a cross-sectional view taken along line 2—2 of FIG. 1.

As shown in FIG. 2, a fluid inlet 20 passes through an upper wall surface of the housing structure and terminates within a first compartment 22 in the forward chamber formed by partition 24. While not shown, a second fluid inlet also is provided in the housing structure which, as with the first fluid inlet, communicates with a second compartment identical to and in the same plane as compartment 22 in the forward chamber 14 formed by partition 24. Each compartment terminates at an upper surface of the corresponding T-shaped blade. Corresponding fluid outlets 26 are positioned beneath the fluid inlets in the base of the valve assembly housing for conducting fluids from the valve assembly into an injector.

Openings 28 and 30 within the rear wall 32 of each of the parallel compartments of chamber 14 form a passageway from each of these compartments into the central chamber. Slidable T-shaped blades 36 having a top section and a base are positioned and retained within chamber 14. Aligned, shaped orifices 38 are formed within each blade near a forward portion thereof and pass through bottom 42 of each blade from the top to the bottom surface.

The shape of the orifices is selected to provide an equal percentage orifice shape which produces a change in flow corresponding to a change in blade position that is a constant percentage of the flow prior to the change in blade position. In the present example as shown in FIG. 1, wedge-shaped orifices in each blade provide a controlled oxidizer to fuel mixture ratio over the complete range of fluid flow. That is, the mixture ratio can be held constant or may be varied as needed to optimize system performance. A more detailed discussion of orifice shapes as affecting flow characteristics is available in *ISA Handbook of Control Valves*, 2d Edition (1976), incorporated herein by reference.

The base 44 of each T-shaped blade extends from the top section 40 and passes through openings 28,30 within the rear wall 32 of each parallel compartment and into the central chamber 16. Seals or gaskets 46 are provided to ensure leak-proof seals in the valve assembly.

Within the central chamber 16 there is positioned a T-shaped yoke 48 having a top section 50 and a base section 52. The top 50 of the yoke is functionally joined, such as by pinning, welding and the like to the base 52 of each of the blades 36.

A passageway 54 (see FIG. 2) communicating between the central and aft chambers accommodates shaft 56 of a piston 58 housed in aft chamber 18. The shaft 56 extends through passagway 54 and is attached by a threaded coupling 60 at the base of the shaft 56 to the base 52 of yoke 48.

In cooperative association with the valve assembly housing structure 12, is a position indicator assembly 62 and servo-valve assembly 70 attached thereto.

The position indicator assembly 62 is provided with a housing 64 having a chamber 66 formed therein. A position indicator probe 68 having one end fixedly attached to the aft section of piston 58 is slidably retained within chamber 66. As previously indicated, the seals or gaskets 46 ensure leak-proof seals for the functional components of the valve assembly 10.

The servo-valve assembly 70 includes an electromagnetic motor 72 for positioning a valving mechanism within assembly 70, and ports 74,76 communicating with the aft chamber of the valve assembly 10. The ports are positioned so that fluid supplied to the servo-valve assembly 70 by passageway 78 leading from compartment 22 of the valve assembly may be directed into the aft chamber in front of or to the rear of piston 58.

Figure 3:
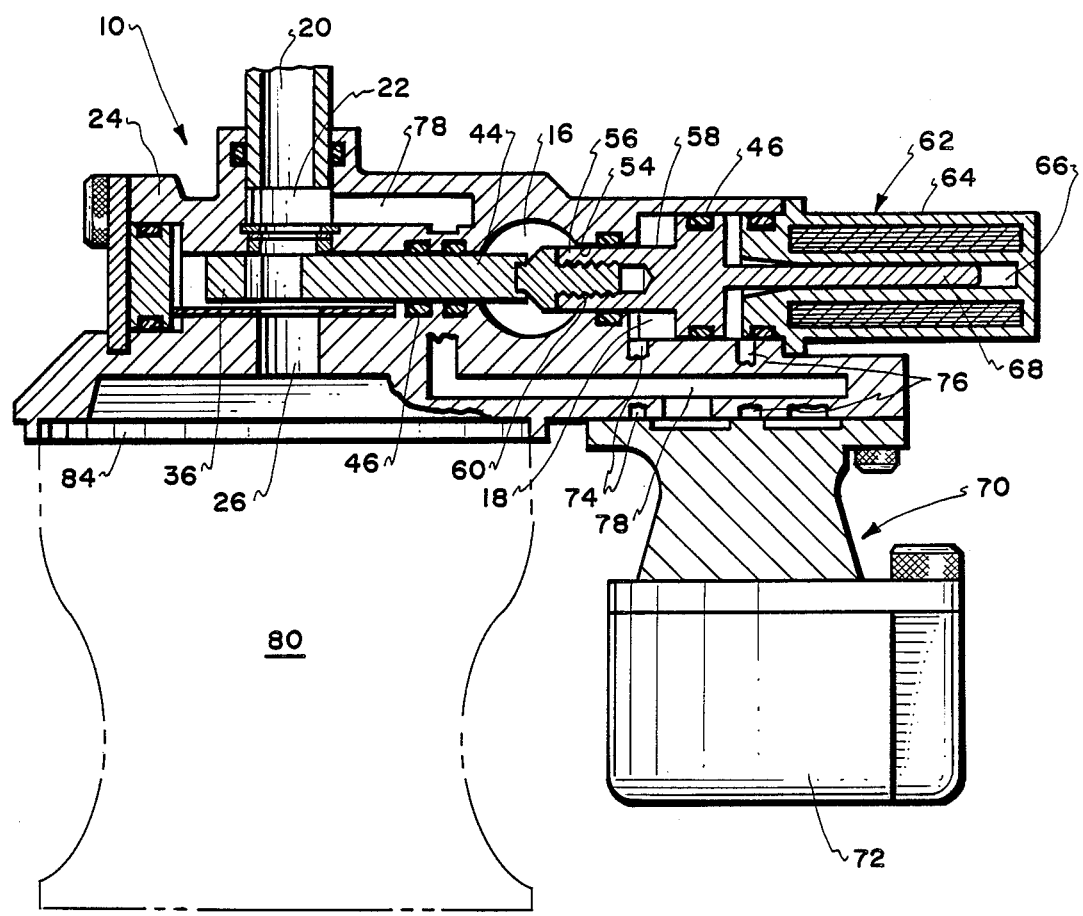
FIG. 3 is a cross-sectional view of the valve assembly of the present invention shown in a preferred embodiment.

As indicated previously, FIG. 3 represents the valve assembly in functional relationship with a rocket engine thrust chamber 80. This embodiment will be utilized to explain the operation of the valve assembly for controlling the flow of two fluids, in this instance, a propellant fuel such as hydrazine and an oxidizer, from a remote storage source such as an oxidizer tank and a fuel tank (not shown).

As seen in FIGS. 2 and 3, fuel under pressure enters inlet 20 and passes through passageway 78 to the servo-valve assembly 70. Upon activation of the valve assembly by a remote controller (not shown), the motor of the servo-assembly is activated which in the allows a portion of the fuel to be selectively introduced or withdrawn from the aft chamber to function piston 58. The remote controller, which may be commanded by an onboard computer or by a ground controller, is able to determine the position of the blades in the forward chamber by the position of the piston indicator probe 68 housed within the piston indicator assembly 62.

It is to be understood that the servo-assembly 70 is capable of introducing or withdrawing fluid from either side of the piston 58 positioned within the aft chamber upon command. In this manner, the piston may be moved forward or aft as desired to control the positioning of the T-blades 36 in the forward chamber which in turn determines the position of the shaped orifices 38 therein. When a predetermined degree of thrust or impulse is desired, the onboard control system or controller, as the case may be, activates motor 72 which in turn directs fluid through one of the ports into chamber 18. The blades are simultaneously moved aft to a predetermined position and at this time both fuel and oxidizer are allowed to pass through the valve housing 12, the injector 84 and into thrust chamber 80. Any fluid or oxidizer that may leak past seals 46 during operation and into central chamber are allowed to pass to the atmosphere through port 86. In this manner, interaction of the hypergolic propellant mixture within the central chamber 16 is precluded.

In thrust chamber 80 the hypergolic reaction converts the fuel components into high-pressure gases which are in turn converted into thrust for propelling or directing the vehicle as desired.

It will of course be realized that various modifications can be made in the design and operation of the present invention without departing from the spirit thereof. Thus, while the principal, preferred construction, and mode of operation of the invention have been explained, it should be understood that within the scope of the appended claims the invention may be practiced otherwise than as specifically illustrated and described.

What is claimed and desired to be secured by Letters Patent of the United States is:

1. A valve assembly for controlling the flow of multiple fluids from a remote source for the intimate mixing or interaction thereof comprising:

a valve assembly housing;

forward, central and aft chambers each defined by wall surfaces of the valve assembly housing;

a partition within the forward chamber dividing the forward chamber into dual parallel compartments;

openings within a rear wall of each dual parallel compartment extending from each compartment into the central chamber;

slidable T-shaped blades having a top section and a base, the top section of each blade positioned and retained within one of the dual parallel compartments and the base extending from the top section and passing through the opening within the rear wall of each dual parallel compartment and into the central chamber;

a T-shaped yoke having a top section and a base section, the top section positioned within the central chamber and functionally joined to the base of the blades;

a passageway communicating between the central and aft chamber;

a piston, including a shaft and a base, positioned within the aft chamber with the shaft portion extending through the passageway between the central and aft chambers and attached to the base section of the yoke by a threaded coupling;

means for introducing multiple fluids into the valve assembly; and means for functioning the valve assembly.

2. The valve assembly of claim 1 in which each of the slidable T-shaped blades has a shaped orifice near a forward portion thereof extending therethrough from the top to the bottom surface of each blade.

3. The valve assembly of claim 1 in which the housing structure further includes fluid inlets, one passing through an upper wall surface of the housing structure and terminating within one of the dual parallel compartments at an upper surface of a T-shaped blade, the other fluid inlet passing through an upper wall surface of the housing structure and terminating within the other dual parallel compartment at an upper surface of the other T-shaped blade.

4. The valve assembly of claim 1 in which the housing structure also includes fluid outlets, one extending from beneath one of the T-shaped blades and one of the dual compartments, the other fuel outlet extending from beneath the other T-shaped blade in the other of the dual compartments, each communicating with an injector.

5. The valve assembly of claim 1 in which the housing structure includes a position indicator assembly to the rear of the aft chamber.

6. The valve assembly of claim 1 in which the housing structure further includes a fluid passageway in communicative relationship with, and extending between, one of the dual parallel compartments and the servo-valve assembly.

7. The valve assembly of claim 1 in which the housing structure also includes a screened chamber-to-atmosphere port within a wall surface of the central chamber.

8. The valve assembly of claim 1 in which the means the functioning the valve assembly includes a servo-valve assembly having an electromagnetic motor.

9. The valve assembly of claim 8 in which the servo-valve assembly includes ports extending therefrom and into the aft chamber so that one port is positioned forward of the piston and the other port aft of the piston.

10. The valve assembly of claim 5 in which piston position indicator assembly comprises:
   a housing fixedly attached to the aft end of the valve assembly housing structure;
   a chamber within the position indicator housing;
   a position indicator probe fixedly attached to the piston and slidably retained within the chamber; and
   a position indicator which determines the probe location within the chamber, the location of the piston in the aft chamber, and that of the slidable T-shaped blades within the dual parallel compartments of the forward chamber.

11. The valve assembly of claim 2 in which the orifice is wedge-shaped.

12. A fluid injection system for controllably injecting propellants into a combustion chamber of a fluid-fueled rocket engine, comprising:
   a valve assembly housing structure including means for sealably interfacing the fuel injection system and a rocket engine combustion chamber;
   forward, central and aft chambers each defined by wall surfaces of the housing structure;
   a partition within the forward chamber dividing the forward chamber into dual parallel compartments;
   openings within a rear wall of each dual parallel compartment extending from each compartment into the central chamber;
   slidable T-shaped blades having a top section and a base, the top section of each blade positioned and retained within one of the dual parallel compartments and the base extending from the top section and passing through the opening within the rear wall of each dual parallel compartment and into the central chamber;
   a T-shaped yoke having a top section and a base section, the top section positioned within the central chamber and functionally joined to the base of the blades;
   a passageway communicating between the central and aft chambers;
   a piston, including a shaft and a base, positioned within the aft chamber with the shaft extending through the passageway between the central and aft chambers and attached to the base section of the yoke by a threaded coupling;
   means for introducing propellant components into the injection system; and
   means for functioning the injection system to controllably inject propellant components into the combustion chamber of the fluid-fueled rocket engine.

13. The fuel injection system of claim 12 in which each of the slidable T-shaped blades has a shaped orifice near a forward portion thereof extending therethrough from the top to the bottom surface of each blade.

14. The fuel injection system of claim 12 in which the housing structure further includes fluid inlets, one passing through an upper wall surface of the housing structure and terminating within one of the dual parallel compartments at an upper surface of a T-shaped blade, the other fluid inlet passing through an upper wall surface of the housing structure and terminating within the other dual parallel compartment at an upper surface of the other T-shaped blade.

15. The fluid injection system of claim 12 in which the housing structure also includes fluid outlets, one extending from beneath one of the T-shaped blades in one of the dual compartments into an injector communicating with a thrust chamber, the other fluid outlet extending from beneath the other T-shaped blade in the other of the dual compartments and into an injector communicating with the thrust chamber.

16. The fuel injection system of claim 12 in which the housing structure includes a position indicator assembly to the rear of the aft chamber and a servo-assembly located beneath the piston indicator assembly and the aft chamber.

17. The fluid injection system of claim 12 in which the housing structure further includes a fluid passageway in communication with and extending between one of the dual parallel compartments and the servo-valve assembly.

18. The fluid injection system of claim 12 in which the housing structure further includes a screened chamber-to-atmosphere port within a wall surface of the central chamber.

19. The fluid injection system of claim 16 in which the servo-valve assembly includes an electromagnetic motor.

20. The fluid injection system of claim 16 in which the servo-valve assembly further includes ports extending from the servo-assembly into the aft chamber so that one port is positioned forward of the piston and the other port aft of the piston.

21. The fluid injection system of claim 16 in which the position indicator assembly comprises:
   a housing fixedly attached to the aft end of the fluid injection system housing structure;
   a chamber within the piston indicator housing;
   a piston indicator probe fixedly attached to the piston and slidably retained within the chamber; and
   a position indicator which determines the probe location within the chamber, the location of the piston in the after chamber, and that of the slidable T-shaped blades within the dual parallel compartments.

22. The fluid injection system of claim 13 in which the orifice is wedge-shaped.

* * * * *